United States Patent
Yamada et al.

(10) Patent No.: US 7,720,573 B2
(45) Date of Patent: May 18, 2010

(54) ROBOT CONTROL APPARATUS

(75) Inventors: Makoto Yamada, Yamanashi (JP); Kazunori Ban, Yamanashi (JP); Katsutoshi Takizawa, Tokyo (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 294 days.

(21) Appl. No.: 11/812,449

(22) Filed: Jun. 19, 2007

(65) Prior Publication Data

US 2007/0293987 A1 Dec. 20, 2007

(30) Foreign Application Priority Data

Jun. 20, 2006 (JP) ............... 2006-170424

(51) Int. Cl.
*G06F 19/00* (2006.01)

(52) U.S. Cl. .............. 700/245; 700/259; 700/264

(58) Field of Classification Search ........... 700/245, 700/213, 259, 264; 318/567; 382/141
See application file for complete search history.

(56) References Cited

U.S. PATENT DOCUMENTS

| | | | |
|---|---|---|---|
| 5,745,854 A | 4/1998 | Schorman | 455/452 |
| 6,107,601 A * | 8/2000 | Shimogama | 219/130.01 |
| 6,232,735 B1 * | 5/2001 | Baba et al. | 318/567 |
| 7,133,747 B2 * | 11/2006 | Hashimoto et al. | 700/264 |
| 7,151,848 B1 | 12/2006 | Watanabe et al. | |
| 2004/0243282 A1 * | 12/2004 | Watanabe et al. | 700/259 |
| 2005/0004708 A1 * | 1/2005 | Goldenberg et al. | 700/245 |
| 2005/0065653 A1 * | 3/2005 | Ban et al. | 700/245 |
| 2005/0069193 A1 * | 3/2005 | Kumiya et al. | 382/152 |
| 2005/0075752 A1 * | 4/2005 | Ban et al. | 700/213 |
| 2005/0102060 A1 * | 5/2005 | Watanabe et al. | 700/245 |
| 2005/0107920 A1 | 5/2005 | Ban et al. | |
| 2005/0166413 A1 * | 8/2005 | Crampton | 33/503 |
| 2006/0072809 A1 | 4/2006 | Hashimoto | |
| 2007/0075048 A1 * | 4/2007 | Kunisaki et al. | 219/91.1 |

FOREIGN PATENT DOCUMENTS

| | | |
|---|---|---|
| DE | 69929502 | 7/2006 |
| EP | 0997236 | 5/2000 |
| EP | 1533671 | 5/2005 |
| JP | 11-77568 | 3/1999 |
| JP | 2000-135689 | 5/2000 |

(Continued)

OTHER PUBLICATIONS

European Search Report dated Nov. 2, 2007 issued in European Application No. 07011873.2.

(Continued)

*Primary Examiner*—Khoi Tran
*Assistant Examiner*—Jaime Figueroa
(74) *Attorney, Agent, or Firm*—Drinker Biddle & Reath LLP (57) ABSTRACT

A robot control apparatus includes a control apparatus body fixedly installed and connected to a robot and a portable teaching pendant connected to the control apparatus body to operate the robot through the teaching pendant. The teaching pendant includes an imaging device connector for connecting an imaging device to the teaching pendant so as to enable the image picked up by the imaging device to be directly input to the teaching pendant through the imaging device connector.

4 Claims, 5 Drawing Sheets

FOREIGN PATENT DOCUMENTS

| | | |
|---|---|---|
| JP | 2001-121458 | 5/2001 |
| JP | 2001-191285 | 7/2001 |
| JP | 2004-9209 | 1/2004 |
| JP | 2005-149299 | 6/2005 |
| JP | 2006-105782 | 4/2006 |

OTHER PUBLICATIONS

Japanese Notice of Reasons for Rejection mailed May 7, 2008 in Japanese Patent Application No. 2006-170424 (including a partial translation thereof).

* cited by examiner

Fig.5
PRIOR ART

ROBOT CONTROL APPARATUS

BACKGROUND OF THE INVENTION

1. Field of the Invention

The present invention relates to a robot control apparatus for controlling a robot using an imaging device, and more particularly to a robot control apparatus for controlling a robot using an imaging device in order to determine a relative position of a workpiece to the robot and correct a teaching point position of an operation program for the robot based on the determined relative positions.

2. Description of the Related Art

In the field of an industrial robot, an imaging device, such as a camera has been widely used as an eye for a robot. In the case where an imaging device is used for an industrial robot, it is common for the imaging device to be connected to an image processing unit separately provided from or integral with a robot control apparatus and the image processing device and an image display unit for displaying the image thereon are arranged integrally with or in the vicinity of the robot control apparatus. In a factory, it is common to surround the operating range of the robot with a protective fence or the like for the safety of an operator and to arrange the robot control apparatus and the image processing unit outside the protective fence at a sufficient distance from the robot.

As described above, where the image processing unit and the image display unit are installed is often far from the robot, and this poses a problem in that it is difficult to check an image picked up by the imaging device during a robot teaching operation or an adjustment operation of the image processing unit or the imaging device. In order to solve this problem, Japanese Unexamined Patent Publication No. 2000-135689, Japanese Unexamined Patent Publication No. 2001-191285 and Japanese Unexamined Patent Publication No. 2001-121458, for example, propose a portable teaching pendant having an image display and used for the operation of the robot or the image processing unit. The use of this teaching pendant makes it possible for the operator to display an image picked up by the imaging device on the teaching pendant. Therefore, an operator, manually operating the robot, can check the image on the teaching pendant during the robot teaching operation or the adjustment operation of the imaging device or the image processing unit.

The imaging device and the image processing unit (hereinafter collectively referred to as a visual sensor) of the industrial robot, as described above, function as an eye of the robot for doing a job and is continuously used while the robot is used. Therefore, once installed, the visual sensor is basically not removed from the robot.

Figure 5:
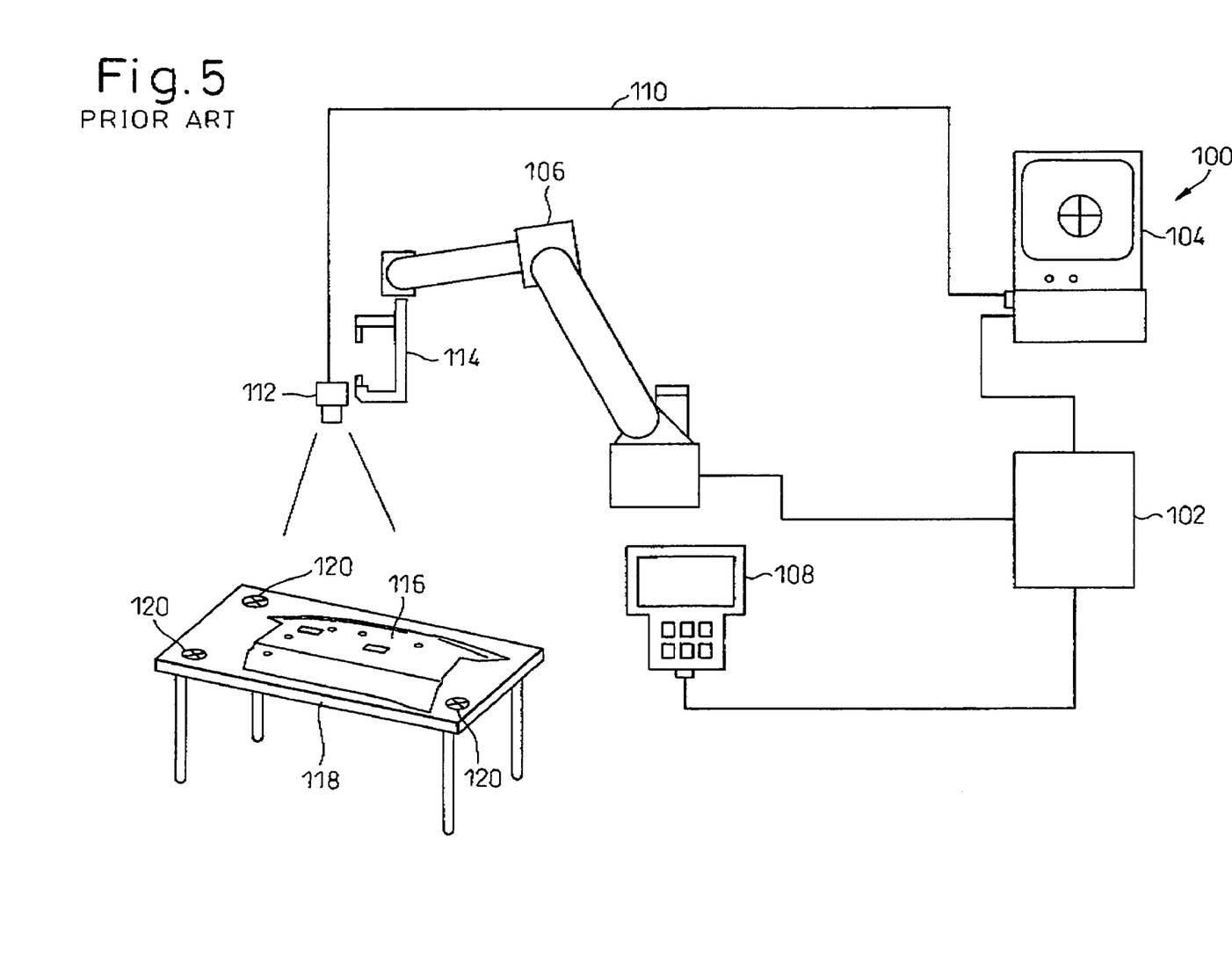
FIG. 5 is a diagram showing a general configuration of the conventional robot system.

However, in recent years, the visual sensor has been temporarily used only when installing the robot system. Japanese Unexamined Patent Publication No. 2005-149299, for example, discloses a teaching position correcting device in which in order to facilitate an operation for correcting teaching points in a robot operation problem at the time of relocation of a robot system, displacement of the relative positions between the installation place of the robot and the workpiece place, which may occur after the relocation of the robot system, is measured by a camera temporarily mounted on the robot to correct positions of teaching points in the robot operation program. The teaching position correcting device 100 disclosed in Japanese Unexamined Patent Publication No. 2005-149299, as shown in FIG. 5, includes an image processing unit 104 connected to a robot control apparatus 102, and a CCD camera 112 connected to the image processing unit 104 by a camera connecting cable 110. An image is picked up by a CCD camera 112 mounted on a working tool 114 of the robot 106 while an operator is operating a teaching pendant 108 connected to the robot control apparatus 102. The image thus picked up is processed by the image processing unit 104, so that three-dimensional positions of three reference marks 120 provided on a holding unit 118 for holding a workpiece 116 are measured to calculate a change in the position of the holding unit 118 relative to the robot 106 based on the positions of the reference marks 120 measured before and after relocation, and the positions of the teaching points defined in the robot operation program are corrected by the calculated change amount.

The image processing unit 104 used in the teaching position correcting device 100 disclosed in Japanese Unexamined Patent Publication No. 2005-149299 is similar to the image processing units disclosed in Japanese Unexamined Patent Publication No. 2000-135689, Japanese Unexamined Patent Publication No. 2001-191285 and Japanese Unexamined Patent Publication No. 2001-121458 and is installed in the vicinity of the robot control apparatus. Further, the CCD camera 112 is connected to the image processing unit 104.

On the other hand, the visual sensor constituted by the CCD camera 112 and the image processing unit 104, as disclosed in Japanese Unexamined Patent Publication No. 2005-149299, unlike a conventional visual sensor of the industrial robot, is not fixed to the robot 106, but used temporarily only to measure the positions of the reference marks 120 at the time of relocation, and one CCD camera 112 is generally used for a plurality of robots 106. Therefore, mounting and demounting the CCD camera 112 from the robot 106 and the robot control apparatus 102 is frequently carried out.

However, in starting a job on a robot 106 after finishing a job on another robot 106, the operator needs to move between the robot 106 and the robot control apparatus 102 installed at a distance from the robot 106 in order to reconnect the CCD camera 112 with the image processing unit 104 or the robot control apparatus 102. Especially on an actual production line, the robot 106 is surrounded by a protective fence for the safety of the operator, and the robot control apparatus 102 and the image processing unit 104 are arranged outside the protective fence. Therefore, the robot 106 and the robot control apparatus 102 are generally far from each other. Also, in some cases, the robot control apparatus 102 and the robot 106 are installed on different floors in a factory layout. Therefore, movement between the robot 106 and the robot control apparatus 102 imposes a heavy burden on an operator.

SUMMARY OF THE INVENTION

Accordingly, it is an object of the present invention to solve the aforementioned problem of the prior art and to reduce the burden on an operator in using one imaging device for a plurality of robots.

In order to achieve this object, according the present invention, there is provided a robot control apparatus, which includes a control apparatus body fixedly installed and connected to a robot and a portable teaching pendant connected to the control apparatus body to operate the robot through the teaching pendant, wherein the teaching pendant includes an imaging device connector for connecting an imaging device to the teaching pendant so as to enable the image picked up by the imaging device to be directly input to the teaching pendant through the imaging device connector.

The imaging device connector may be an imaging device connecting terminal for connecting a cable extending from the imaging device, and the image picked up by the imaging device may be transmitted through the cable and input to the teaching pendant.

Also, the imaging device connector may be a radio receiver for receiving a radio signal transmitted from the imaging device, and the image picked up by the imaging device may be transmitted wirelessly and input to the teaching pendant.

The teaching pendant may include an image processing unit for processing the image input to the teaching pendant, or the control apparatus body may include an image processing unit, so that the image input to the teaching pendant may be transmitted to and processed by the image processing unit of the control apparatus body.

Since the teaching pendant of the robot control apparatus according to the present invention includes an imaging device connector for connecting the imaging device such as a camera to the teaching pendant, the imaging device can be connected to the control apparatus body via the teaching pendant to make the imaging device usable, simply by connecting the imaging device to the teaching pendant. Therefore, in the case where an imaging device used temporarily when relocating a robot system is connected to another robot system and used in another robot system, the operator is not required to move between the robot and the control apparatus body installed at a place far from the robot in order to connect and demount the imaging device from the control apparatus body, thereby reducing the burden on the operator.

BRIEF DESCRIPTION OF THE DRAWINGS

The above and other objects, features and advantages of the present invention will be described in more detail below based on preferred embodiments of the present invention with reference to the accompanying drawings, in which.

DETAILED DESCRIPTION OF THE INVENTION

The preferred embodiments of a robot control apparatus according to the present invention will be described below with reference to the accompanying drawings.

Figure 1:
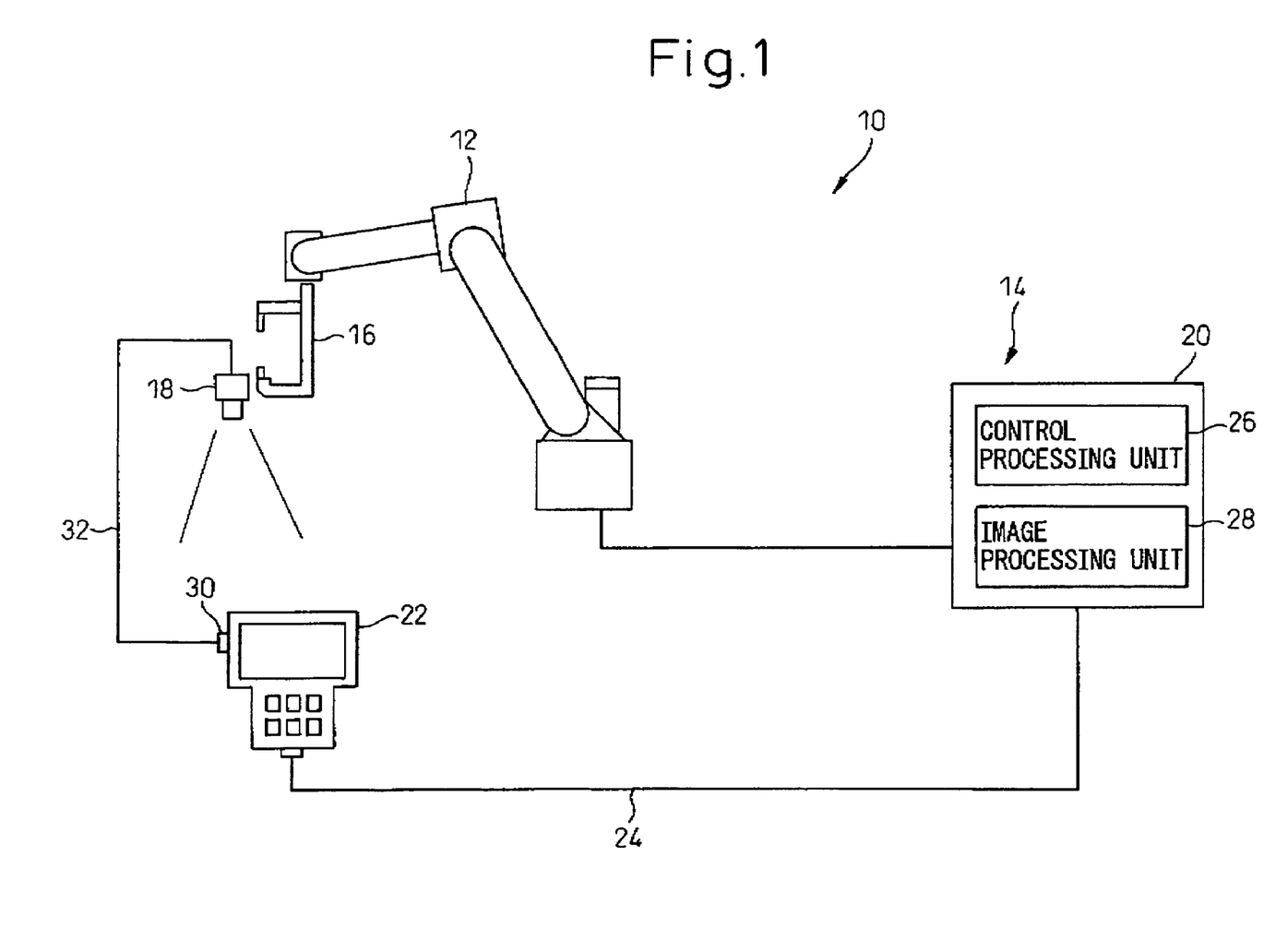
FIG. 1 is a diagram showing a general configuration of a robot system including a robot control apparatus according to a first embodiment of the present invention.

First, a robot control apparatus according to a first embodiment of the present invention will be described with reference to FIGS. 1 and 2. FIG. 1 is a diagram showing a general configuration of a robot system 10 including a robot control apparatus 14 according to the first embodiment of the present invention. The robot system 10 includes a robot arm 12, and a robot control apparatus 14 for controlling operation of the robot arm 12. A working tool 16 is attached to the forward end of the robot arm 12. In this embodiment, the working tool 16 is a welding gun for spot-welding, and the robot arm 12 conducts a welding job on a workpiece (not shown) such as a metal panel fixed to a holding unit (not shown) or the like (see FIG. 5). Also, the working tool 16 attached to the robot arm 12 has a CCD camera mounted thereon as an imaging device, and the CCD camera is used to correct positions of teaching points in a robot operation program based on displacement of relative positions between the robot arm 12 and the workpiece which occur when relocating the robot system 10.

The CCD camera 18, upon completion of an operation for correcting the positions of the teaching points in the robot operation program for one robot system, can also be used in another robot system. For this purpose, the CCD camera 18 is mounted on the working tool 16 by an appropriate mounting means, such as a magnet or a clamp which allows the CCD camera 18 to be easily mounted and demounted from the working tool 16. The CCD camera 18 is used, in this case, as the imaging device. However, other types of cameras may of course be used as the imaging device.

The robot control apparatus 14 includes a control apparatus body 20 fixedly arranged at a position far from the robot arm 12, and a portable teaching pendant 22 connected to the control apparatus body 20 by a teaching pendant connecting cable 24. The control apparatus body 20 includes a control processing unit 26 for generating an operation command to the robot arm 12 and the working tool 16, and an image processing unit 28 for processing the image picked up by the imaging device such as the CCD camera 18. The control processing unit 26 and the image processing unit 28 may be integrated with each other or may be separated from each other. An operator can operate the robot arm 12 and the image processing through the teaching pendant 22 from the vicinity of the robot arm 12 by carrying the teaching pendant 22.

The teaching pendant 22 further includes a camera connecting terminal 30, as an imaging device connector for connecting the imaging device such as the CCD camera 18 to the teaching pendant 22, so that the camera connecting cable 32 extending from the CCD camera 18 can be directly connected to the teaching pendant 22. The image picked up by the CCD camera 18, after being sent to the teaching pendant 22 through the camera connecting cable 32, is transmitted to the image processing unit 28 of the control apparatus body 20 from the teaching pendant 22 through the teaching pendant connecting cable 24 to execute predetermined processing, such as extraction of a predetermined shape and calculation of the position thereof. Also, the teaching pendant 22 includes a liquid crystal display (LCD) 60 as a display unit so as to make it function as a monitor of the image processing unit 28 as well. Thus, the image input from the CCD camera 18 and the processing results from the image processing unit 28 can be displayed thereon.

After relocation of the robot system 10, the relative position relationship between the robot arm 12 and the holding unit (see FIG. 5) for holding the workpiece may change. Therefore, it is necessary to mount the CCD camera 18 on the working tool 16, detect positions of reference marks using the CCD camera 18, and correct positions of the teaching points defined in the robot operation program based on the detected positions of the reference marks. However, in the case that a conventional robot control apparatus is used, the CCD camera 18 is connected to the image processing unit 28 of the control apparatus body 20 through the camera connecting cable 32. Therefore, in the case that a single CCD camera 18 is used, in a plurality of the robot systems 10, for correcting the positions of the teaching points in the robot operation program, the operator needs to move between the robot arm 12 and the control apparatus body 20 in order to connect the CCD camera 18 to another robot arm 12 and robot control apparatus 14 associated with it, which poses a great burden on the operator.

In contrast, the teaching pendant 22 of the robot control apparatus 14 according to this embodiment has the camera connecting terminal 30, and the CCD camera 18 cannot be connected to the image processing unit 28 of the control apparatus body 20 arranged at a place far from the robot arm 12, but to the teaching pendant 22 located in the vicinity of the robot arm 12. Therefore, when the CCD camera 18 used in one robot arm 12 is connected to another robot arm 12, the operator can connect the CCD camera 18 to the robot control apparatus 14 through the teaching pendant 22 and the teaching pendant connecting cable 24 to allow the CCD camera 18 to be used by the robot control apparatus 14 for another robot arm 12, simply by mounting the CCD camera 18 on another robot arm 12 and connecting the camera connecting cable 32 of the CCD camera 18 to the teaching pendant 22 for another robot arm 12 arranged in the vicinity of another robot arm 12. As a result, the operator is not required to move between the robot arm 12 and the control apparatus body 20 arranged at a place far from the robot arm 12 in order to connect the robot control apparatus 14 and the camera connecting cable 32, thereby reducing the burden on the operator.

Next, with reference to FIG. 2, the robot control apparatus 14 according to the present invention will be described in more detail. FIG. 2 is a function block diagram showing the control apparatus body 20 and the teaching pendant 22 of the robot control apparatus 14 shown in FIG. 1. The robot control apparatus 14 includes a main CPU 36 constituted by a microprocessor, memory such as ROM 38 and RAM 40, a servo control circuit 42, a communication interface 44 for communication with the teaching pendant 22, a camera interface 46 for receiving an image signal from the CCD camera 18, an image processing unit 28 and a servo amplifier 48. Of these components, the ROM 38, the RAM 40, the servo control circuit 42, the communication interface 44, the camera interface 46 and the image processing unit 28 are connected in parallel to each other with a bus 50 connected to the main CPU 36. The servo control circuit 42 generates an operation command signal for the robot arm 12 in accordance with a command from the main CPU 36. This operation command signal, after being amplified by the servo amplifier 48, is transmitted to the robot arm 12 to cause the robot arm 12 to operate based on the operation command signal.

The teaching pendant 22 includes a CPU 52 constituted by a microprocessor, memory such as ROM 54 and RAM 56, a graphic controller 58, a liquid crystal display 60 connected to the graphic controller 58 for displaying image information thereon, a key control circuit 62, a communication interface 64 connected to the communication interface 44 of the control apparatus body 20 for providing signal communication, and a camera connecting terminal 30 for connecting the CCD camera 18 as an imaging device to the teaching pendant 22. Of these components, the ROM 54, the RAM 56, the graphic controller 58, the key control circuit 62 and the communication interface 64 are connected in parallel to each other with a bus 68 connected to the CPU 52. On the other hand, the camera connecting terminal 30 is connected to the camera interface 46 of the control apparatus body 20 through the teaching pendant connecting cable 24 without through the bus 68 connected to the CPU 52, so that an image signal from the CCD camera 18 can be relayed as it is to the camera interface 46. The image signal output from the CCD camera 18 may be either an analog image signal typically conforming to NTSC or a digital image signal. Also, an appropriate cable such as a USB cable, IEEE1394 cable or Ethernet (registered trade mark) cable can be used as the camera connecting cable 32 for communication between the CCD camera 18 and the camera connecting terminal 30.

Figure 2:
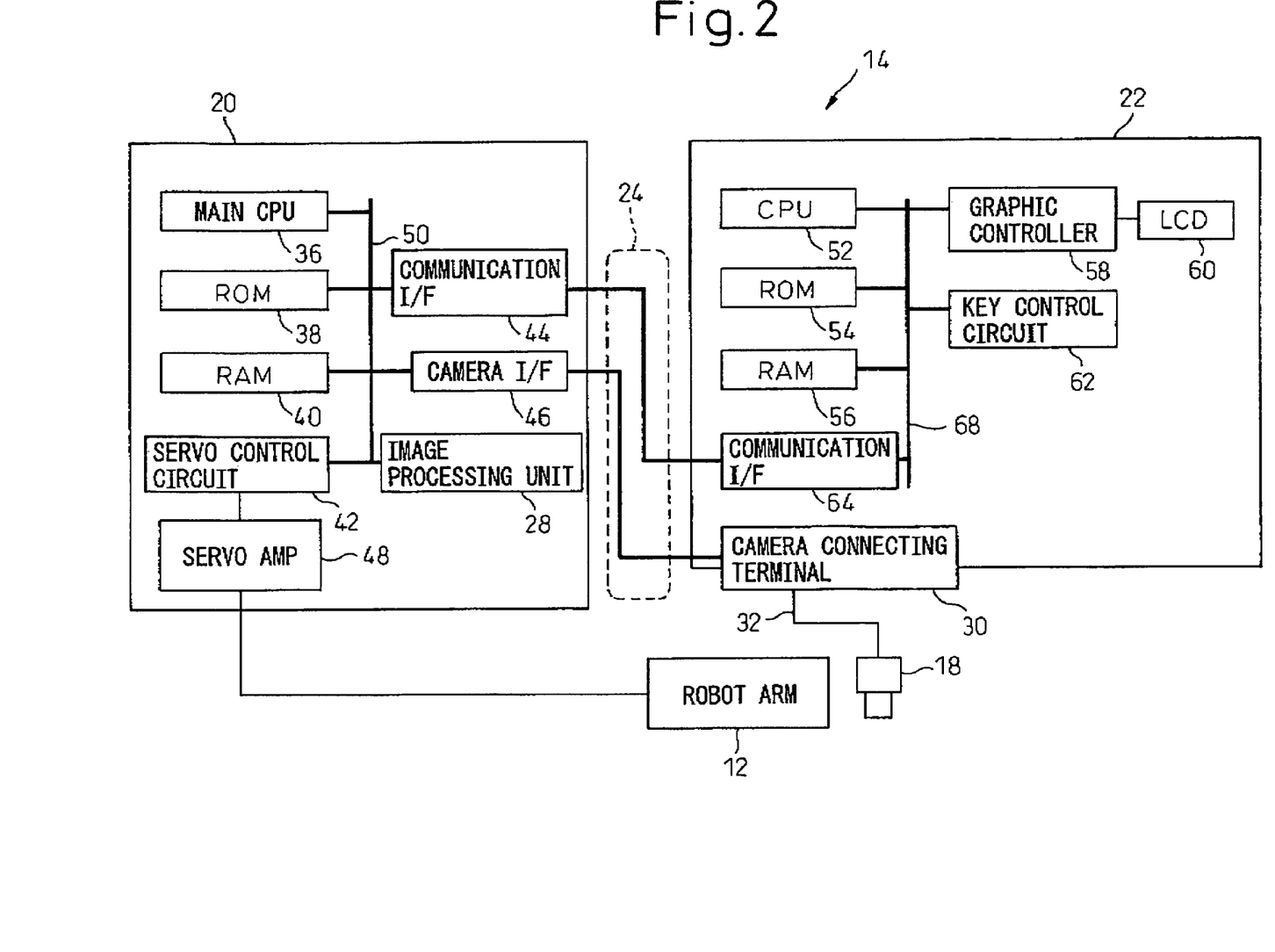
FIG. 2 is a function block diagram of the robot control apparatus shown in FIG. 1.

In the embodiment shown in FIG. 2, the image signal from the CCD camera 18 is relayed as it is to the camera interface 46 through the camera connecting terminal 30. However, in the case that the transmission distance of the teaching pendant connecting cable 24 is long or a high-quality image signal transmission is required, an A/D converting circuit for digitizing analog NTSC signals may be provided in the teaching pendant 22, and digitized image signals may be transmitted to the control apparatus body 20 through the teaching pendant connecting cable. As an alternative, a signal amplification circuit may be provided in the teaching pendant 22, and the signal from the CCD camera may be amplified by the teaching pendant 22 and then transmitted to the control apparatus body 20.

Figure 3:
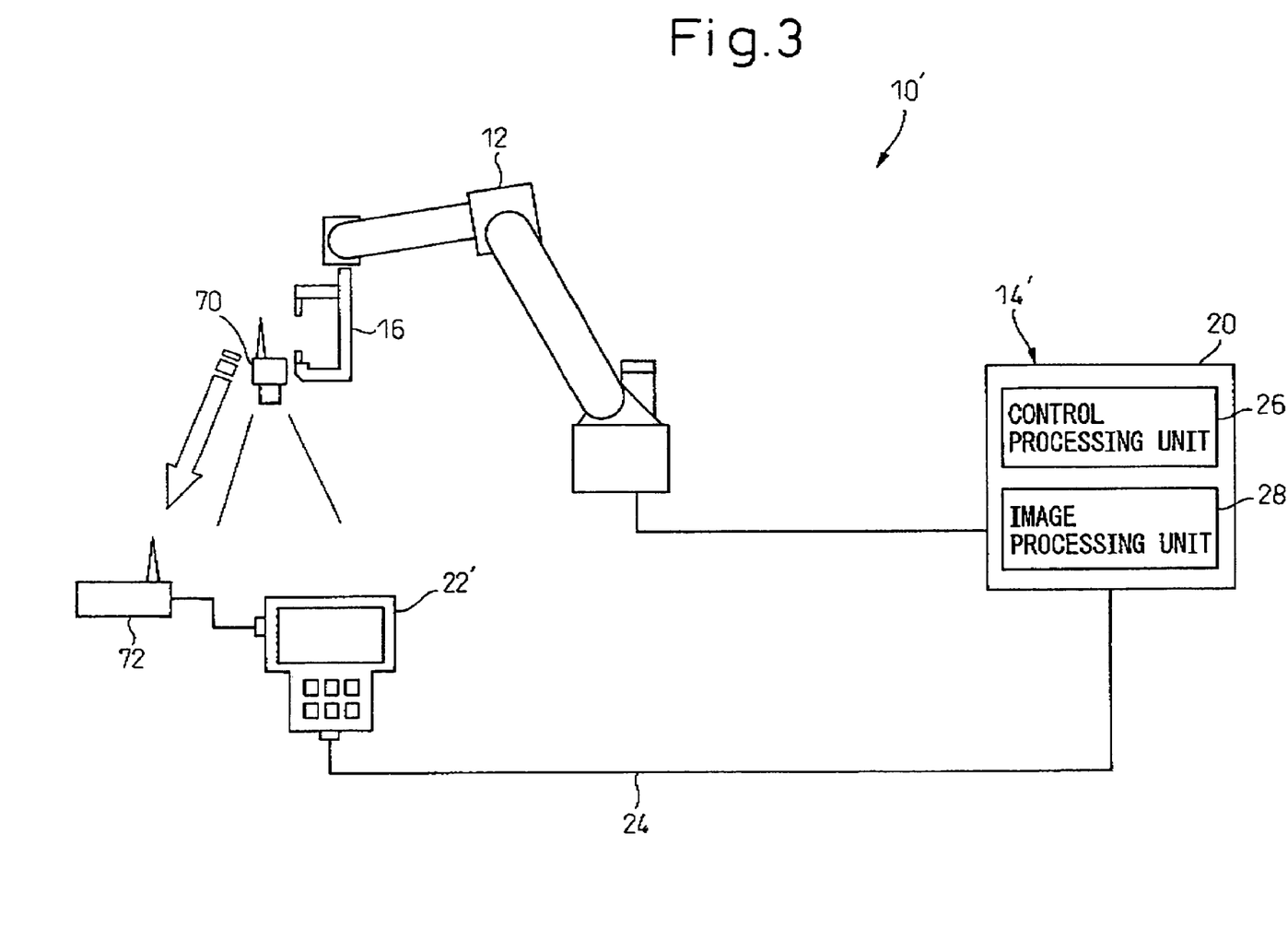
FIG. 3 is a diagram showing a general configuration of a robot system including a robot control apparatus according to a second embodiment of the present invention.

Next, with reference to FIG. 3, a robot control apparatus according to a second embodiment of the present invention will be described. FIG. 3 is a diagram showing a general configuration of a robot system 10' including a robot control apparatus 14' according to the second embodiment of the present invention. In FIG. 3, the same components as those of the robot system 10 shown in FIG. 1 are designated by the same reference numerals, respectively.

The robot system 10' according to this embodiment is different from the robot system 10 shown in FIG. 1 in that an image signal is transmitted wirelessly between a CCD camera 70 and a teaching pendant 22'. A wireless CCD camera 70 is mounted on the working tool 16 of the robot arm 12 by an appropriate mounting means for facilitating mounting and demounting of the wireless CCD camera 70. The wireless CCD camera 70 does not transmit the image signal to external circuits through the camera connecting cable 32, but by a radio signal. Accordingly, the teaching pendant 22' of the robot control apparatus 14' is provided with a radio receiver 72 as an imaging device connector. The other components are similar to those of the robot system 10 shown in FIG. 1 and will not be described in detail here.

As described above, in the robot system 10' according to this embodiment, the image signal from the CCD camera 70 mounted on the working tool 16 is transmitted wirelessly to the radio receiver 72 of the teaching pendant 22', and by wire from the teaching pendant 22' to the control apparatus body 20 through the teaching pendant connecting cable 24. As a result, the camera connecting cable 32 between the CCD camera 70 and the teaching pendant 22' is eliminated, and therefore the operator is not exposed to danger of contacting the camera connecting cable 32 when the robot arm 12 moves, thereby leading to an advantage in that various operations can be facilitated. Generally, wireless communication is not suitable for long distance signal transmission, and is difficult to be used for signal transmission between the CCD camera 70 and the control apparatus body 20. However, in the operation of correcting the positions of the teaching points, the operator generally operates the robot arm 12 in the vicinity of the robot arm 12 while carrying the teaching pendant 22'. Therefore, the distance between the CCD camera 70 and the teaching pendant 22' is short, and a wireless communication system can be employed for signal transmission between the CCD camera 70 and the teaching pendant 22'.

Figure 4:
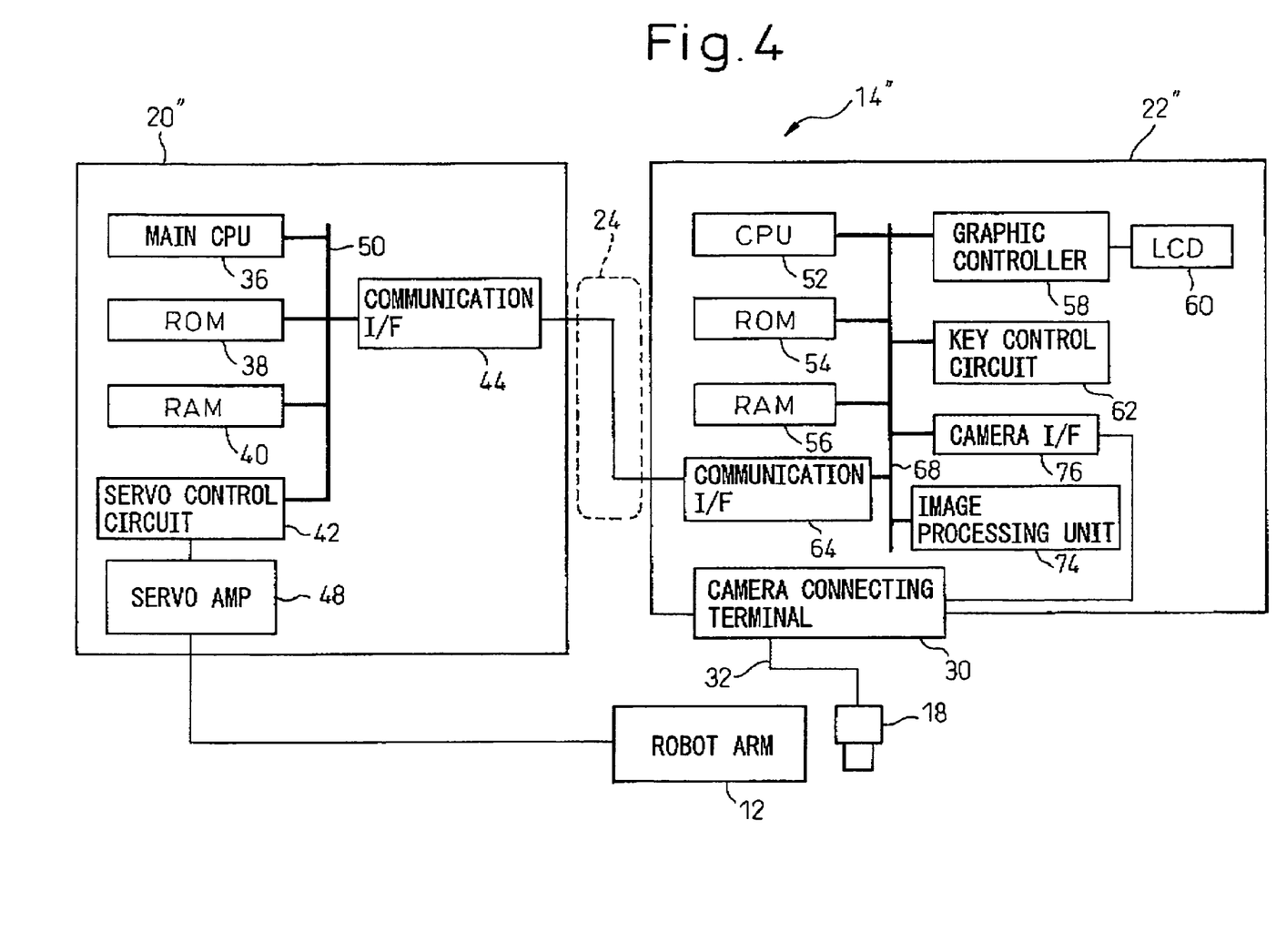
FIG. 4 is a function block diagram of a robot control apparatus according to a third embodiment of the present invention.

Next, with reference to FIG. 4, a robot control apparatus according to a third embodiment of the present invention will be described. FIG. 4 is a function block diagram showing a robot control apparatus 14" according to the third embodiment of the present invention. In FIG. 4, the same components as those of the robot control apparatus 14 shown in FIG. 2 are designated by like reference numerals, respectively.

The robot control apparatus 14" according to this embodiment is different from the robot control apparatus 14 shown in FIG. 2 in that an image processing unit 74 and a camera interface 76 are not included in a control apparatus body 20", but in a teaching pendant 22". The teaching pendant 22"

includes, as in the robot control apparatus 14 shown in FIG. 2, a CPU 52, memory, such as ROM 54 and RAM 56, a graphic controller 58, a liquid display 60, a key control circuit 62, a communication interface 64 and a camera connecting terminal 30, and further includes a camera interface 76 for taking image signals from the CCD camera 18, and an image processing unit 74. Of these components, the ROM 54, the RAM 56, the graphic controller 58, the key control circuit 62, the communication interface 64, the image processing unit 74 and the camera interface 76 are connected in parallel to each other with the bus 68 connected with the CPU 52. On the other hand, the camera connecting terminal 30 is not connected to the bus 68 connected to the CPU 52, but to the camera interface 76. Therefore, the image on the CCD camera 18 can be directly displayed on the liquid crystal display 60, and not through the control apparatus body 20". The other components of the configuration are similar to those of the robot control apparatus 14 shown in FIG. 2, and will not be described in detail here.

In the robot control apparatus 14" according to this embodiment, the image signal input to the camera connecting terminal 30 is transmitted to the image processing unit 74 through the camera interface 76 and the bus 68 in the teaching pendant 22" for image processing. As a result, information on the workpiece position (for example, the positions of the reference marks on the camera image) detected by image processing is sent from the teaching pendant 22" to the control apparatus body 20". The image picked up by the CCD camera 18 can of course be displayed on the liquid crystal display 60.

Although the robot control apparatus according to the present invention has been described above with reference to the embodiments, the present invention is not limited to these embodiments. For example, in the robot control apparatus 14" shown in FIG. 4, a wireless CCD camera can be used, and a radio receiver can be used in place of the camera connecting terminal.

What is claimed is:

1. A robot control apparatus comprising a control apparatus body fixedly installed and connected to a robot, and a portable teaching pendant connected to the control apparatus body to operate the robot through the teaching pendant,
   wherein the teaching pendant includes an imaging device connector for disconnectably connecting an imaging device to the teaching pendant, said imaging device connector being configured so that when the imaging device is connected to the imaging device connector, the imaging device connector allows the image picked up by the imaging device to be directly input to the teaching pendant and the teaching pendant applies shaping processing to signals of the image and then transmits the signals to the control apparatus body and
   wherein the control apparatus body comprises an image processing unit, so that the image input to the teaching pendant is transmitted to and processed by the image processing unit of the control apparatus body.

2. The robot control apparatus according to claim 1, wherein the imaging device connector comprises an imaging device connecting terminal for connecting a cable extending from the imaging device, and the image picked up by the imaging device is transmitted through the cable and input to the teaching pendant.

3. The robot control apparatus according to claim 1, wherein the imaging device connector comprises a radio receiver for receiving the radio signal transmitted from the imaging device, and the image picked up by the imaging device is transmitted wirelessly and input to the teaching pendant.

4. The robot control apparatus according to claim 1, wherein the shaping processing comprises a digitizing of analog signals, an amplification of signals or a combination thereof.

* * * * *